(12) United States Patent
Huang

(10) Patent No.: US 7,337,489 B2
(45) Date of Patent: Mar. 4, 2008

(54) JOINT ASSEMBLY OF A CAR WINDSHIELD WIPER ARM

(76) Inventor: Shih-Hsien Huang, 7F.-2, No. 37, Jhengsin St., Zuoying District, Kaohsiung City 813 (TW)

( * ) Notice: Subject to any disclaimer, the term of this patent is extended or adjusted under 35 U.S.C. 154(b) by 0 days.

(21) Appl. No.: 11/524,922

(22) Filed: Sep. 22, 2006

(65) Prior Publication Data

US 2007/0067939 A1    Mar. 29, 2007

(30) Foreign Application Priority Data

Sep. 23, 2005    (TW) ............................... 94216586 U

(51) Int. Cl.
*B60S 1/40* (2006.01)

(52) U.S. Cl. ............... 15/250.32; 15/250.43; 403/321; 403/326; 403/329; 403/24

(58) Field of Classification Search ............. 15/250.32, 15/250.43, 250.44, 250.361; 403/24, 321, 403/326, 329
See application file for complete search history.

(56) References Cited

U.S. PATENT DOCUMENTS

| | | | |
|---|---|---|---|
| 6,516,491 B2 | 2/2003 | Merkel et al. | 15/250.201 |
| 6,643,889 B1 | 11/2003 | Kotlarski | 15/250.32 |
| 6,668,419 B1 | 12/2003 | Kotlarski | 15/250.43 |
| 6,810,556 B1 | 11/2004 | Kotlarski | 15/250.43 |
| 6,836,926 B1 | 1/2005 | De Block | 15/250.43 |
| 6,836,927 B2 | 1/2005 | De Block | 15/250.43 |
| 6,874,195 B2 | 4/2005 | Kotlarski et al. | 15/250.201 |
| 6,886,213 B2 | 5/2005 | Merkel et al. | 15/250.32 |
| 6,904,639 B2 | 6/2005 | Dietrich et al. | 15/250.43 |
| 2004/0025280 A1 | 2/2004 | Krickau et al. | 15/250.32 |
| 2004/0098821 A1 | 5/2004 | Kraemer et al. | 15/250.201 |

FOREIGN PATENT DOCUMENTS

| | | | |
|---|---|---|---|
| JP | 2005-75240 | * | 3/2005 |
| JP | 2005-119453 | * | 5/2005 |

* cited by examiner

*Primary Examiner*—Gary K. Graham
(74) *Attorney, Agent, or Firm*—Bacon & Thomas, PLLC

(57) ABSTRACT

An upper cover body has left and right grooves between a solid core and left and right sides; a round groove near a front side; a rear facing receptacle across a rear of the solid core; the left and right sides including left and right ribs extending to the rear end encompassing a hollow socket; an elastic embed hook on the rear end corresponding with the receptacle and having a forward facing nose. A chassis has a bottom plate, left and right plates extending upward from respective sides of the bottom plate, and a rear plate; a fixing hole in the bottom plate; an upright curbing plate at the rear end of the bottom plate; a front horizontal fixing pivot between the left and right plates; an upright hollow plug encompassed by the left, right, and rear plates; an insetting hole centered in the rear plate.

1 Claim, 13 Drawing Sheets

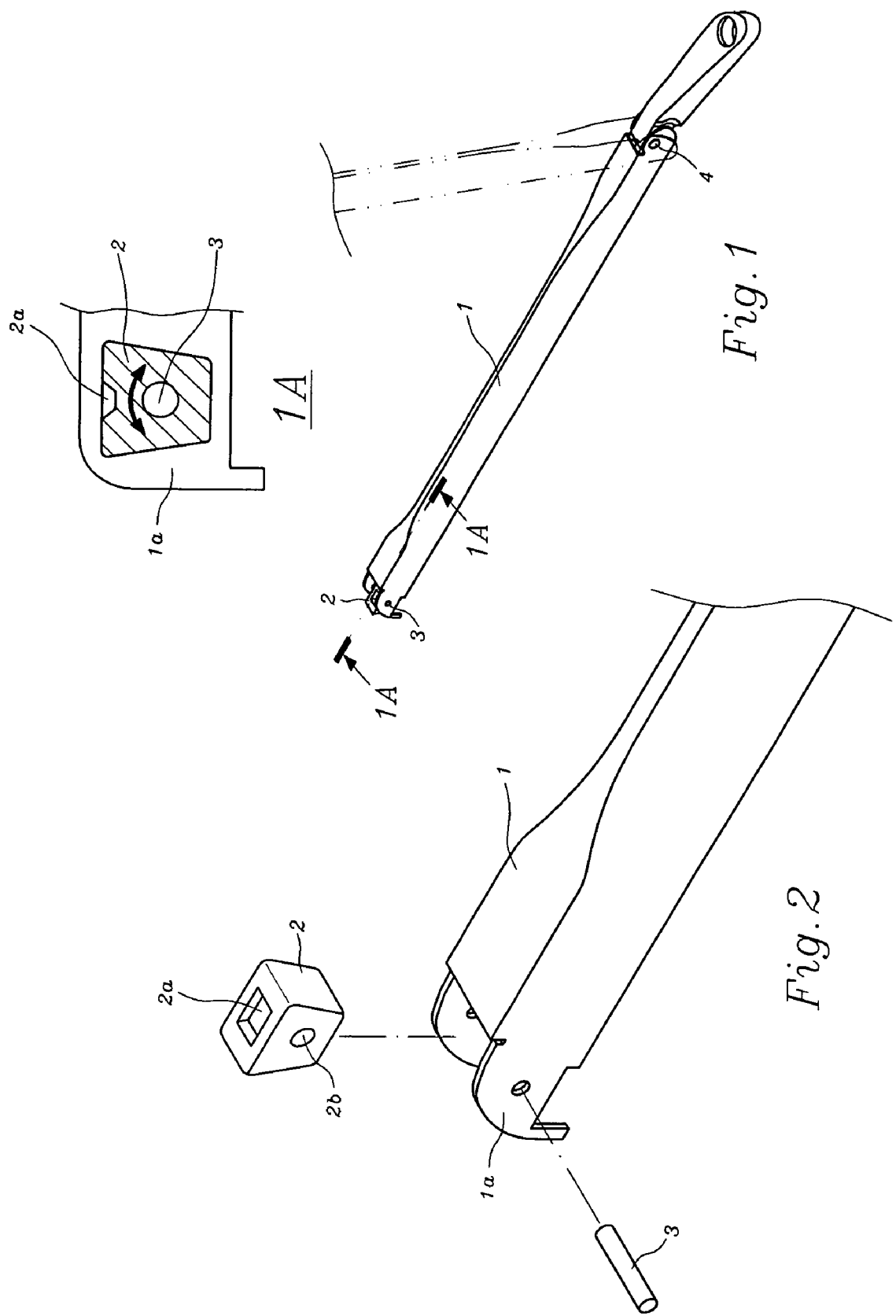

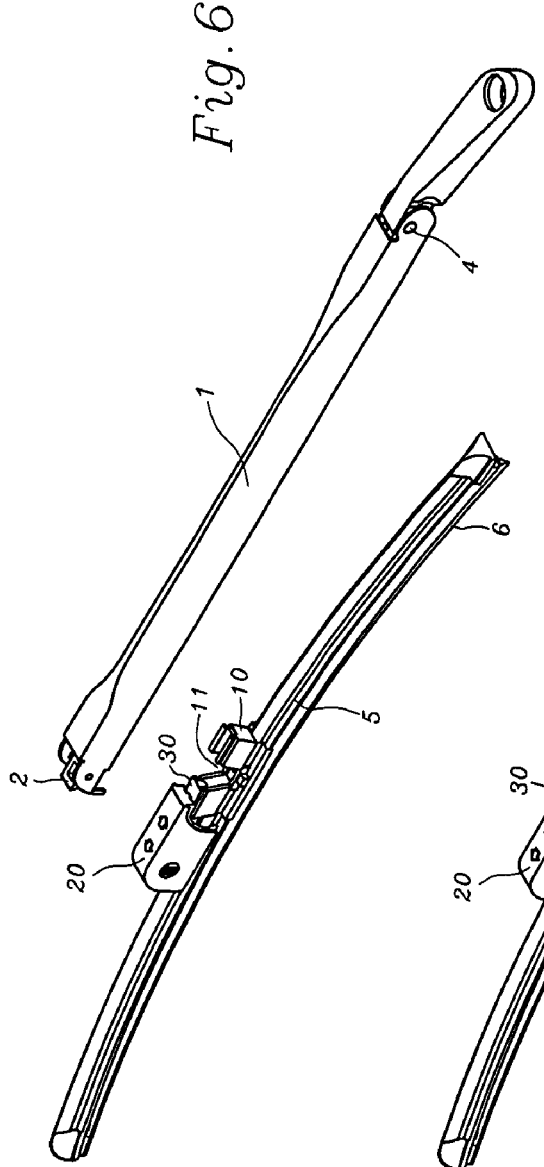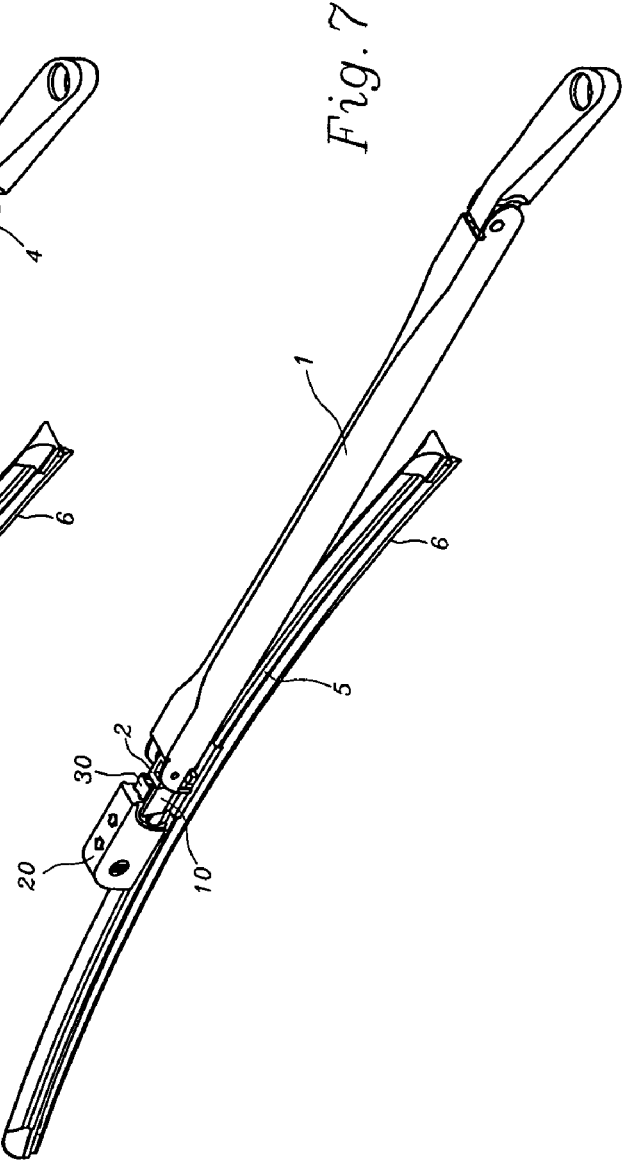

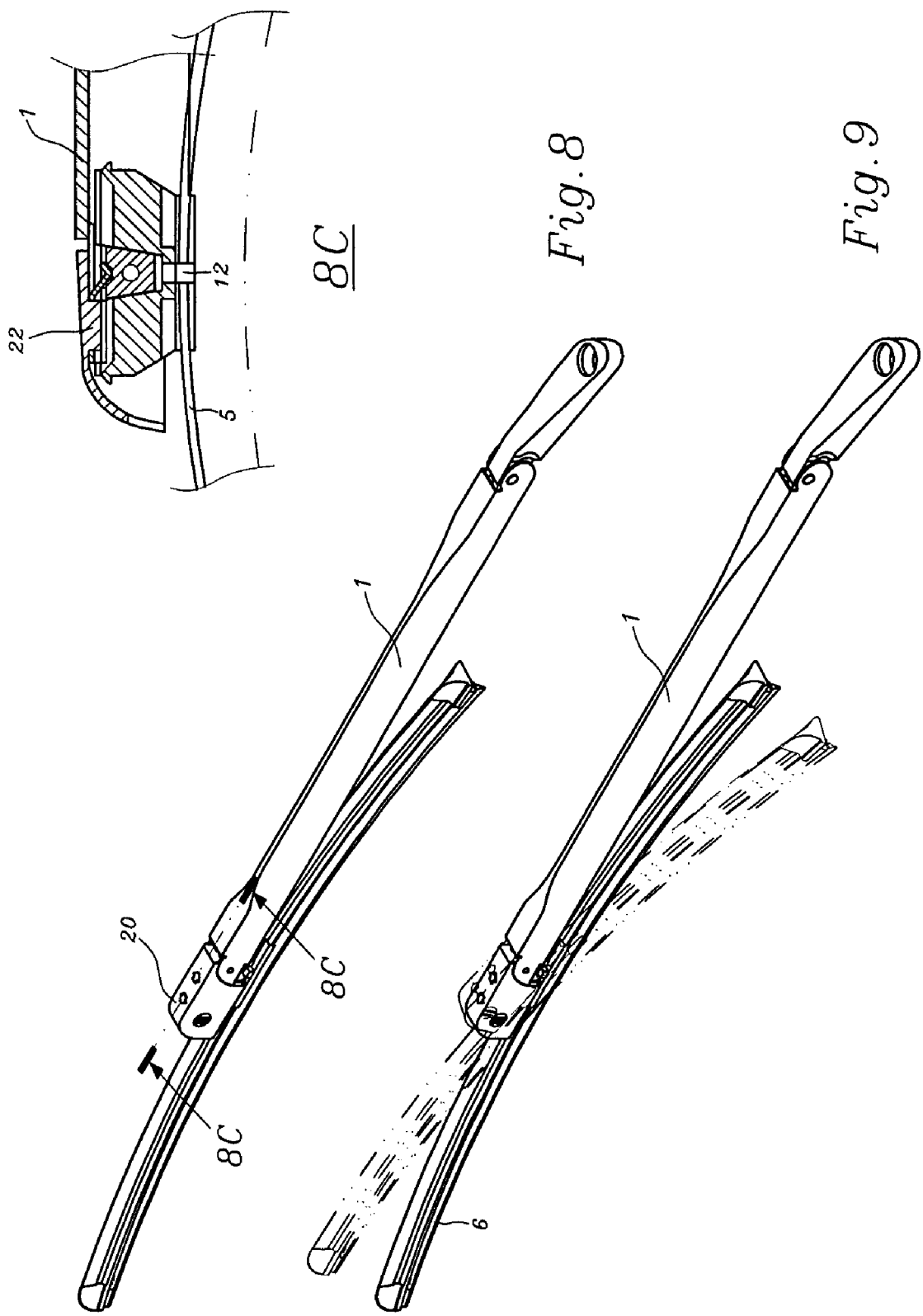

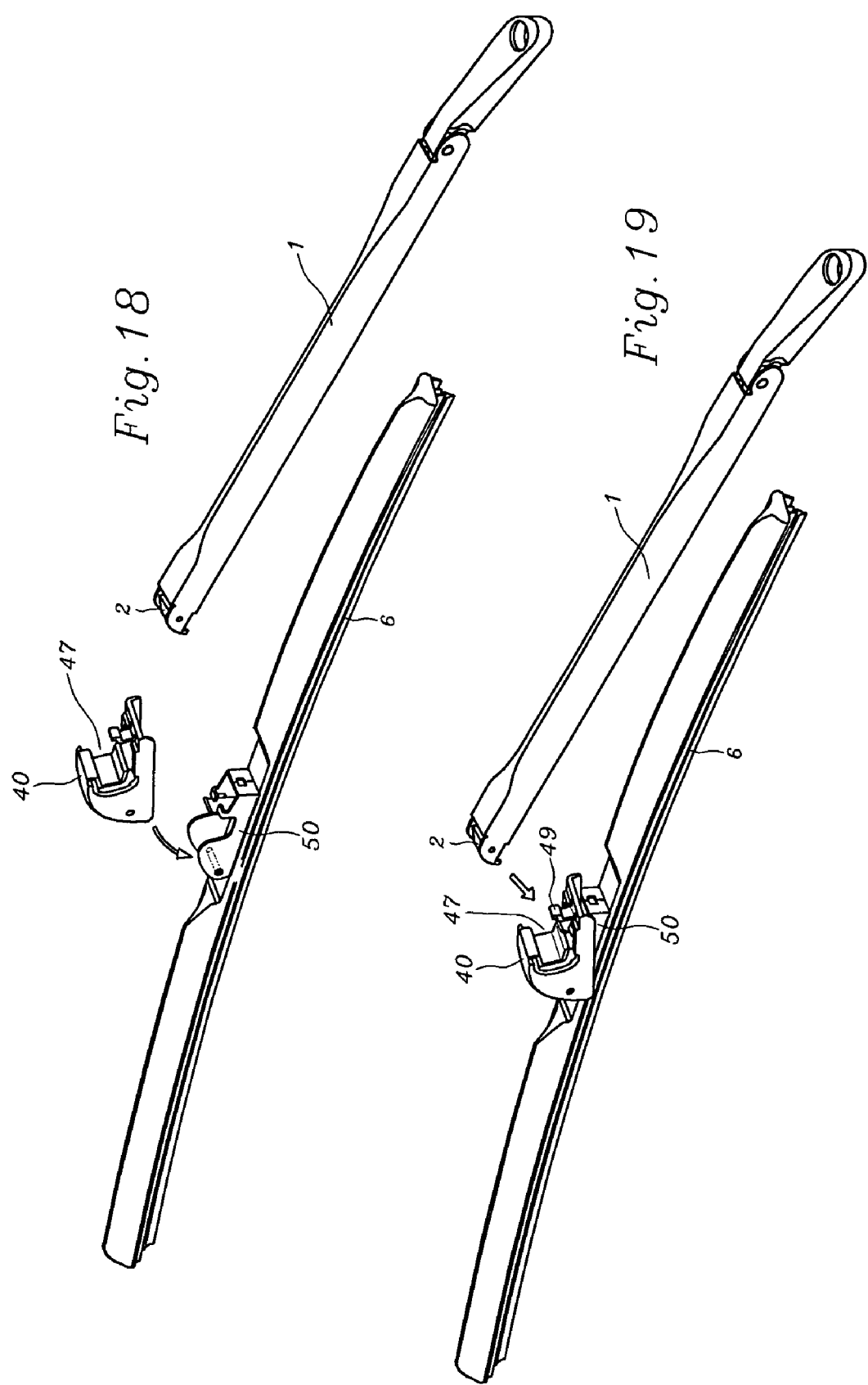

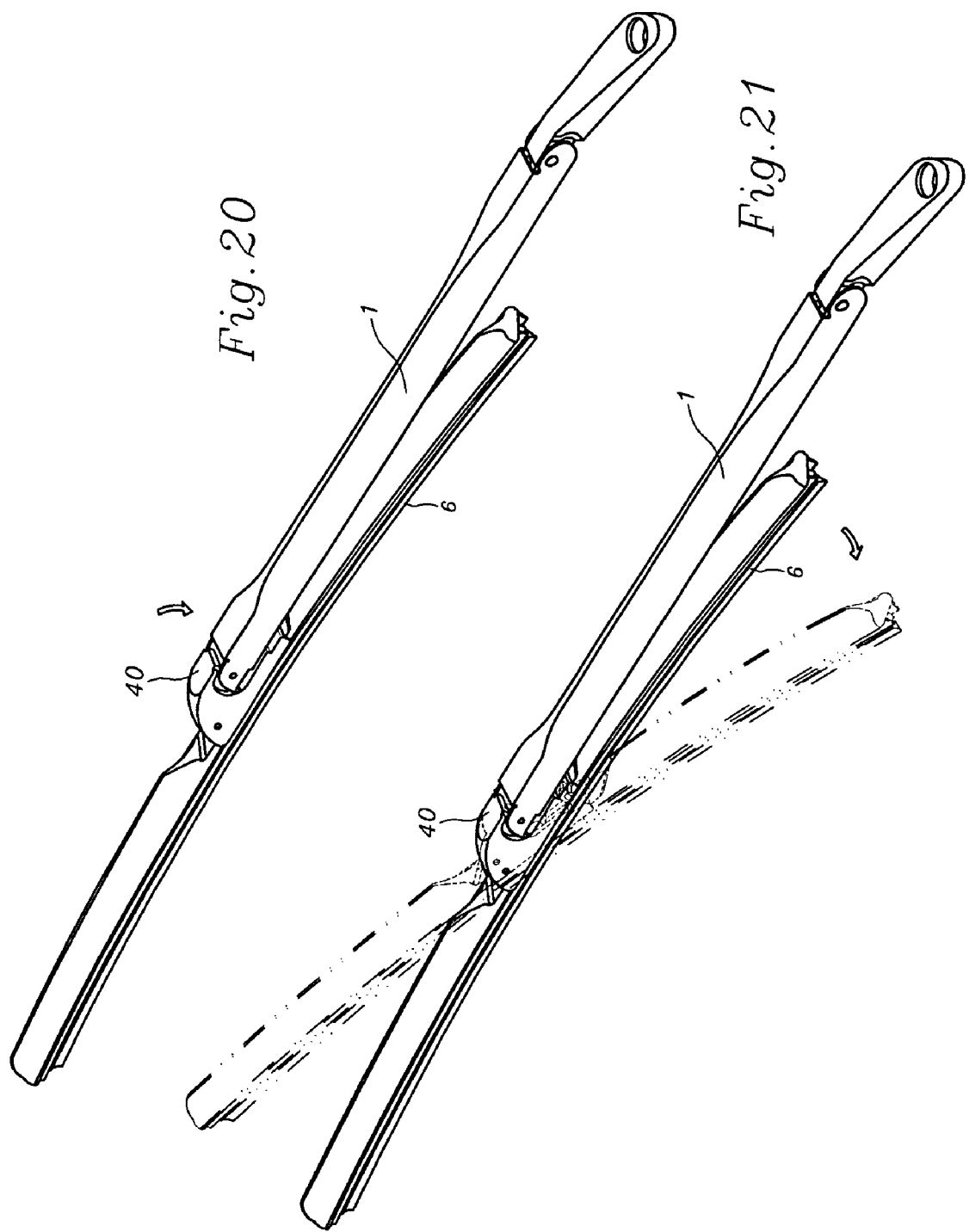

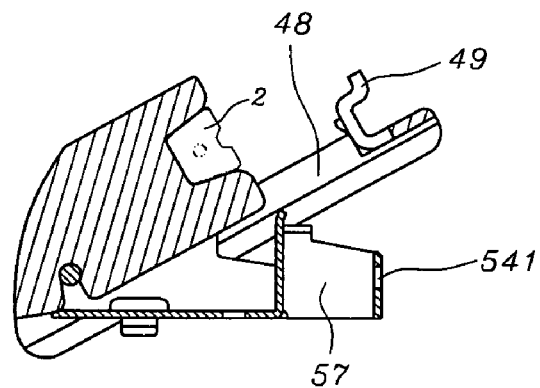
*A*
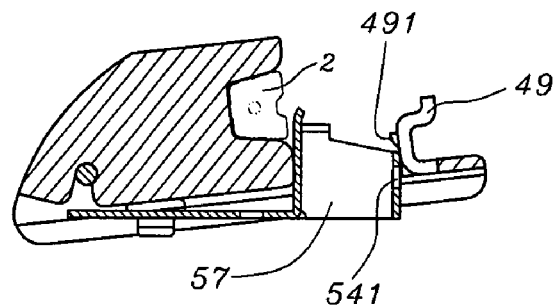
*B*
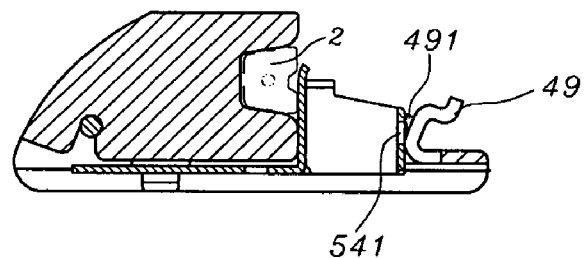
*C*
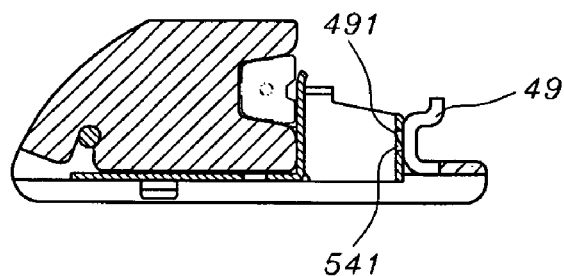
*D*
Fig.22

JOINT ASSEMBLY OF A CAR WINDSHIELD WIPER ARM

FIELD OF THE PRESENT INVENTION

The present invention relates to a joint assembly of a windshield wiper arm, more particularly being contrived for the wiper arm with trapezohedron shaft. Hence, the drawback of hurting windshield caused by the wiper dropping off during replacement procedure of worn wiper by new one can be avoided.

BACKGROUND OF THE PRESENT INVENTION

Presently, the types in head of windshield wiper arm are many in variety. Different type design of wiper arm head must be coordinated with its exclusive jointer to enable securely joint each other. Such as USA issued patents U.S. Pat. No. 6,516,491, U.S. Pat. No. 6,643,889, U.S. Pat. No. 6,668,419, U.S. Pat. No. 6,810,556, U.S. Pat. No. 6,836,927, U.S. Pat. No. 6, 836,926, U.S. Pat. No. 6,874,195, U.S. Pat. No. 6,886,213 and U.S. Pat. No. 6,904,639 as well as USA published patents US2004/0025280 and US2004/0098821, all disclosed their different types of wiper arm head in association with its exclusive jointers. In which, a conventional wiper arm 1 having a trapezohedron shaft 2 at its head with its exclusive jointer is shown in the FIG. 1 through FIG. 7. The free end of the wiper arm 1 is pivoted with a trapezohedron shaft 2, and its other fixing end is soundly locked on the output shaft of the wiper motor (not shown in the figures); an elastic foldable articulation 4 is fitted near its fixing end to enable said wiper arm 1 being folded in upright position during replacing worn wiper blade by new one. Wherein, a bezel notch 2a is contrived in the wider surface of said trapezohedron shaft 2; and a spindle hole 2b is created in its central axial line to be inserted a fixing spindle 3 in order to enable itself rotate freely between a pair of parallel and symmetrically protruded holding plates 1a:1b on the both sides in front end of said wiper arm 1 (as shown in the 1A-1A sectional view of the FIG. 1).

Refer to FIG. 3 through FIG. 5, the exclusively coordinated jointer of said wiper arm 1 with said trapezohedron shaft 2 on the head comprises a main body 10, a sliding canopy 20 and a stopping plate 30; wherein, a trapezohedron receptacle 11 is concaved in the center of said main body 10 in upright position with opening upwards; a fixing hole 12 is perforated at the center in bottom side of said trapezohedron receptacle 11, and a pair of symmetrical sliding seat is formed on both sides of said trapezohedron receptacle 11; a unitary-molded parallel and symmetrical inset clip 14 is molded at the bottom portion of each said sliding seat 13; in which, a pair of parallel and symmetrical upper sliding rail 131 is built on the top surface of each said sliding seat 13, and a pair of parallel and symmetrical lower sliding track 132 is created the joint with said inset clip 14 at its bottom side; Said sliding canopy 20 is a cannulation compassed by a front side, a left side, a right side and a top side; a pair of parallel and symmetrical lower sliding rail 21 is formed at bottom in each inner wall of its left side and right side, and a protruding bar 22 is molded at center in inner wall of its top side; Said stopping plate 30 is pressed by a rectangular metal plate with both long lateral edge being bent downwards to form a pair of parallel and symmetrical upper sliding track 31; a indented downwards elastic bulge buckle 32 and an infixing bar hole 33 is respectively pressed at the center of its top side. By means of squeezing said protruding bar 22 inset in said sliding canopy 20 from infixing bar hole 33, said stopping plate 30 can be fixed on the inner wall in top side of said sliding canopy 20 (as shown in the 4B-4B sectional view of the FIG. 4); by further means of aligning said lower sliding rail 21 on said sliding canopy 20 and said upper sliding track 31 on said stopping plate 30 respectively with said lower sliding track 132 and said upper sliding rail 131 on said stopping plate 30, the opening of said trapezohedron receptacle 11 on said main body 10 (as shown in the FIG. 5).

The rigging assembly of said wiper arm 1 with said trapezohedron shaft 2 on the head and windshield wiper is shown in the FIG. 6 through FIG. 9. First, by means of grasping the central position of said wiper elastic strip 5 from said parallel inset clip 14 at the bottom of said main body 10 and riveting through said fixing hole 12, both of said main body 10 and said wiper elastic strip 5 can be intimately engaged steadfastly (as shown in the 8C-8C sectional view of the FIG. 8); Next, slide said sliding canopy 20 outwards to prevent said stopping plate 30 from blocking the opening of said trapezohedron receptacle 11 on said main body 10 (as shown in the FIG. 6); Then, with keeping said bezel notch 2a face upwards, by means of aligning said trapezohedron shaft 2 on the head of said wiper arm 1 with the opening of said trapezohedron receptacle 11, said trapezohedron shaft 2 can be smoothly mounted in said trapezohedron receptacle 11 (as shown in FIG. 7); subsequently, slide said sliding canopy 20 towards said wiper arm 1 up to said elastic bulge buckle 32 on said stopping plate 30 falling into said bezel notch 2a on the top surface of said trapezohedron shaft 2 with snap sound, the rigging couple of said wiper arm 1 with windshield wiper is finished now. Consequently, said trapezohedron shaft 2 is embedded to prevent from detaching out of said trapezohedron receptacle 11 (as shown in the 8C-8C sectional view of FIG. 8); furthermore, with free rotation function of said trapezohedron shaft 2, said wiper is enabled to sway or tilt on said wiper arm 1 in some limit (as shown in the hypothetical dash-line image of the FIG. 9). However, during the replacement of worn wiper by new one, the aforesaid jointer of said trapezohedron shaft 2 has the drawback of being easy to inadvertently drop and hurt the windshield or the lacquer of the hood. Refer to FIG. 10 and FIG. 11, the worn wiper must be first dismantled from said wiper arm 1 before replacement by means of applying an upwards force on said wiper arm 1, which tightly stays with the windshield G in horizontal position (as shown in the FIG. 10); With pivot of said elastic foldable articulation 4, said wiper arm 1 become in upright position to enable the wiper scraping blade 6 folded away from windshield G (as shown in FIG. 11); Then, the dismantle procedure can be start to proceed with steps shown in each sectional view of the FIG. 12 as below:

a. With fingers holding on both lateral sides of said sliding canopy 20, apply a force on it towards the lengthwise direction away of the head in said wiper arm 1 (as shown the force F action illustration of the FIG. 12);

b. If acting force F is greater than the engaging force of said elastic bulge buckle 32 in said stopping plate 30, said elastic bulge buckle 32 can be slipped out of said bezel notch 2a on said trapezohedron shaft 2 (as shown in B view of the FIG. 12);

c. During said sliding canopy 20 sliding outwards, said stopping plate 30 will not block the opening of said trapezohedron receptacle 11 any more (as shown in C view of the FIG. 12); then, under the gravity, said wiper scraping blade 6 and said main body 10 will separate off said trapezohedron shaft 2 on the head of said wiper arm 1 for their total weight (as shown in D view of the FIG. 12) to finish the dismantle procedure of worn wiper.

In aforementioned step a, said wiper arm 1 can unexpectedly re-bounce back to horizontal position with hurt on the surface of said windshield G in consequence of a horizontal component force F1 of said acting force F will simultaneously apply a torque on the head of said wiper arm 1 to cause the reaction of spring force on said elastic foldable articulation 4; And, In step b, the apply force can easily be too much so that said sliding canopy 20 detach off said main body 10 to drop on said windshield G or the ground for having acting force F greater than the engaging force of said elastic bulge buckle 32 ; Furthermore, in step c, any careless will let total worn wiper scraping blade 6 hit and hurt said windshield G in bad consequence of dropping without catching it in time.

SUMMARY OF THE PRESENT INVENTION

The main object of the present invention is to provide a joint of a car windshield wiper arm, which comprises an upper cover body and a chassis; Exploiting the round groove cut of the upper cover body and the fixing pivot on the chassis being intimately engaged each other to serve as a pivot, as well as the elastic upright embed hook of the upper cover body and the insetting hole on the chassis being inset each other, hence, the drawback of hurting windshield caused by said wiper being dropped off during replacement procedure of worn wiper by new one can be avoided.

BRIEF DESCRIPTION OF THE DRAWINGS

FIG. 1 is the 3-D illustrative view of the conventional wiper arm with trapezohedron shaft.

FIG. 1A is a cross sectional view on line 1A-1A of FIG. 1.

FIG. 2 is the partial 3-D illustrative view of the conventional wiper arm with trapezohedron shaft.

FIG. 4B is a cross sectional view on line 4B-4B of FIG. 4.

FIG. 6 is the first 3-D illustrative view in assembly of the conventional wiper arm with trapezohedron shaft in association with its joint assembly.

FIG. 7 is the second 3-D illustrative view in assembly of the conventional wiper arm with trapezohedron shaft in association with its joint assembly.

FIG. 8 is the third 3-D illustrative view in assembly of the conventional wiper arm with trapezohedron shaft in association with its joint assembly.

FIG. 8C is a cross sectional view on line 8C-8C of FIG. 8.

FIG. 9 is the fourth 3-D illustrative view in assembly of the conventional wiper arm with trapezohedron shaft in association with its joint assembly.

FIG. 18 is the first 3-D illustrative view in assembly of the present invention and the conventional wiper arm with trapezohedron shaft.

FIG. 19 is the second 3-D illustrative view in assembly of the present invention and the conventional wiper arm with trapezohedron shaft.

FIG. 20 is the third 3-D illustrative view in assembly of the present invention and the conventional wiper arm with trapezohedron shaft.

FIG. 21 is the fourth 3-D illustrative view in assembly of the present invention and the conventional wiper arm with trapezohedron shaft.

FIG. 22 is the illustrative view of the present invention in buckle engagement action of the upper cover body with chassis.

DETAILED DESCRIPTION OF THE PREFERRED EMBODIMENTS

Figure 3:
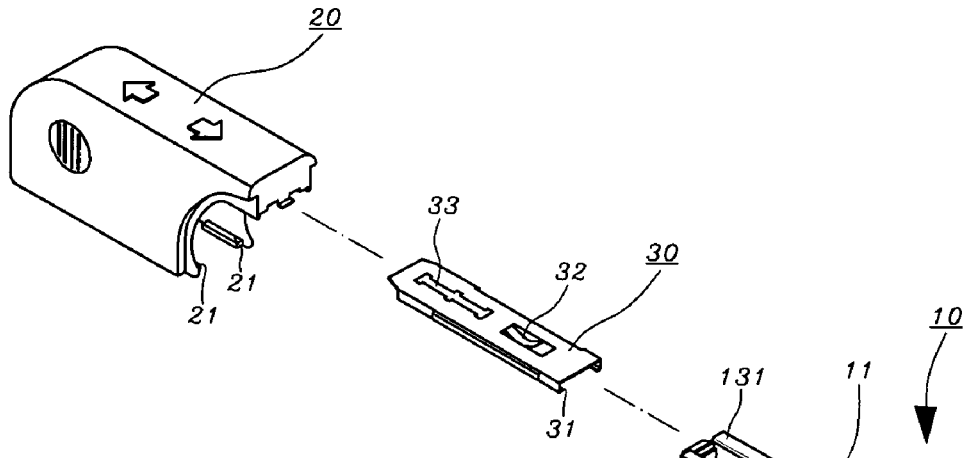
FIG. 3 is the first exploded view in decomposition of a joint assembly in association with the conventional wiper arm with trapezohedron shaft.
Figure 4:
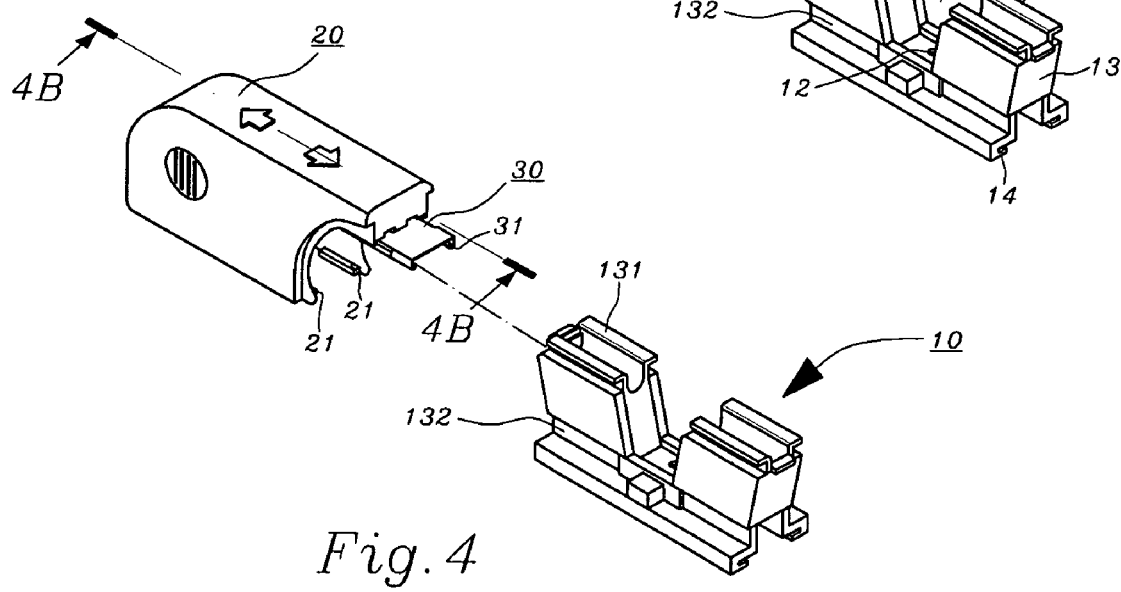
FIG. 4 is the second exploded view of a joint assembly in decomposition in association with the conventional wiper arm with trapezohedron shaft.
Figure 5:
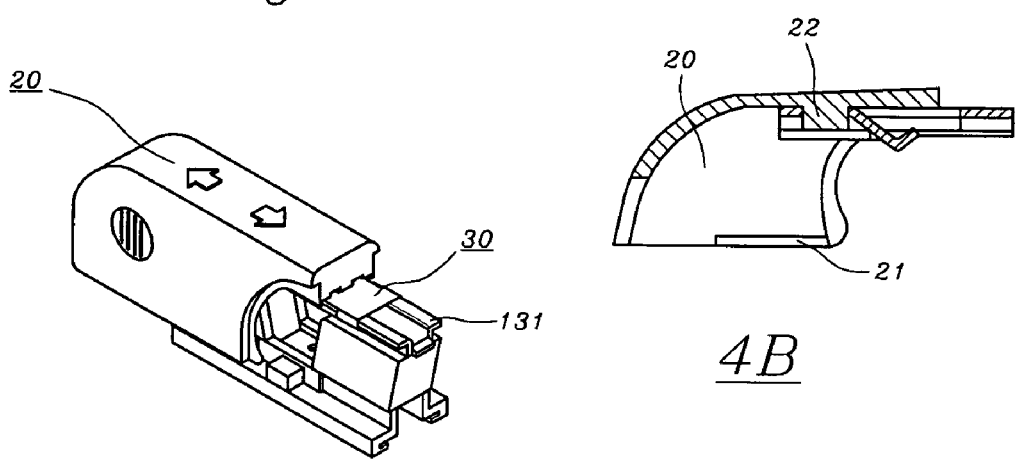
FIG. 5 is the 3-D view of a joint assembly in composition in association with the conventional wiper arm with trapezohedron shaft.
Figure 10:
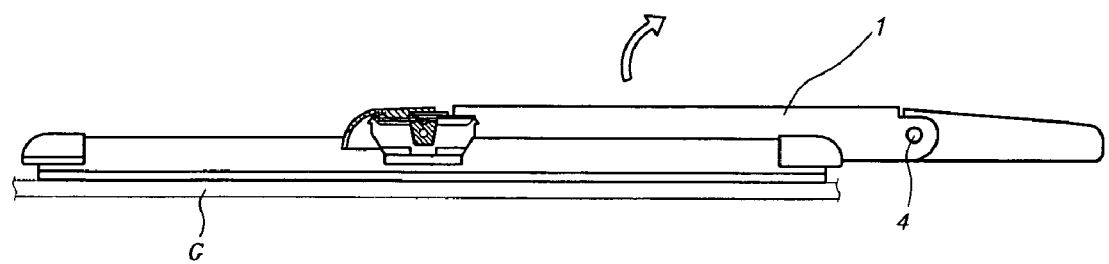
FIG. 10 is the first operation illustrative view of the conventional wiper arm with trapezohedron shaft in the combination with windshield wiper.
Figure 11:
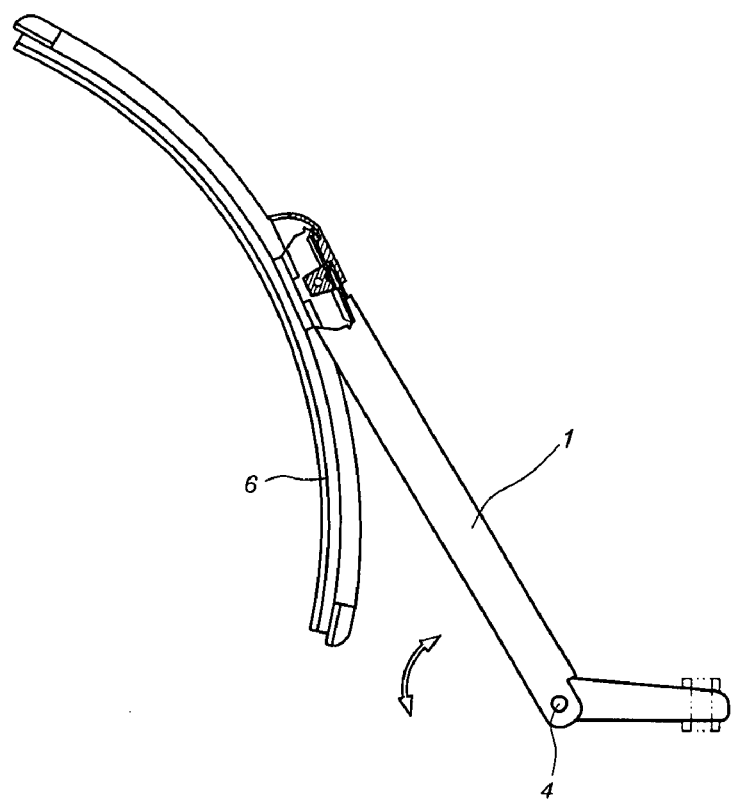
FIG. 11 is the second operation illustrative view of the conventional wiper arm with trapezohedron shaft in the combination with windshield wiper.
Figure 12:
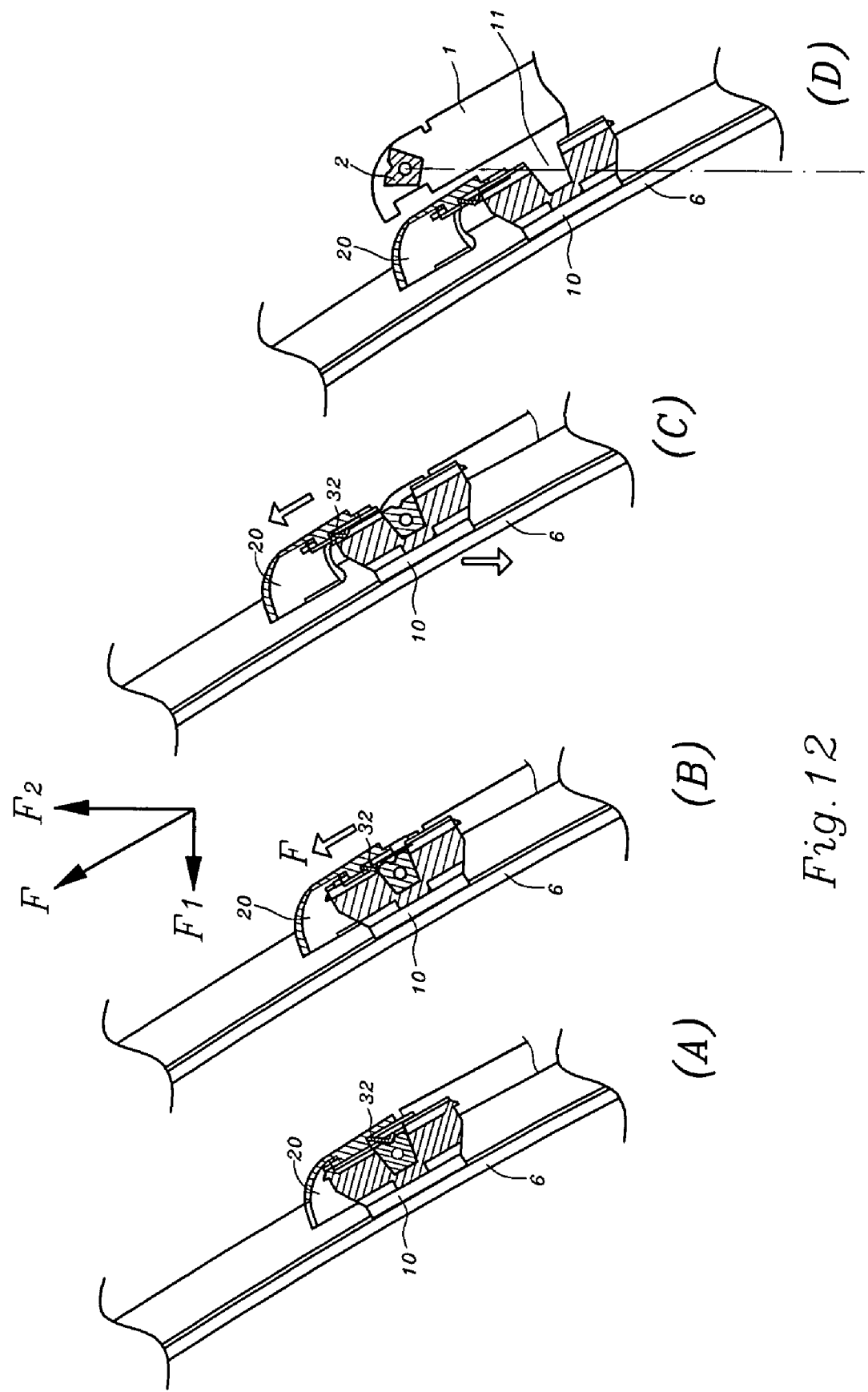
FIG. 12 is the illustrative view in dismantling step of the conventional wiper arm with trapezohedron shaft in association with its joint assembly.
Figure 13:
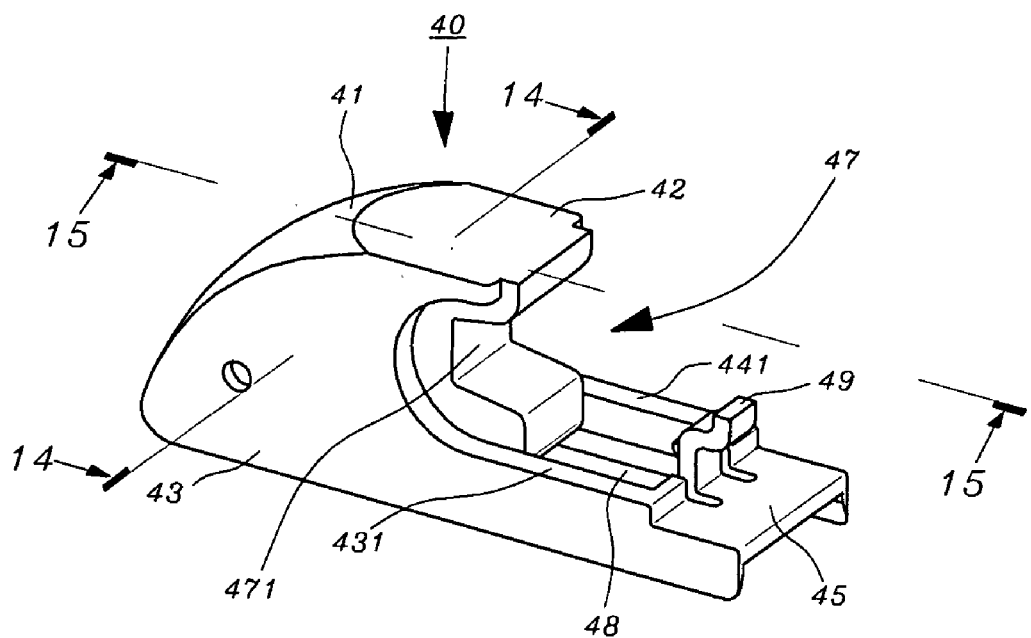
FIG. 13 is the 3-D view of the upper cover body of the present invention.
Figure 14:
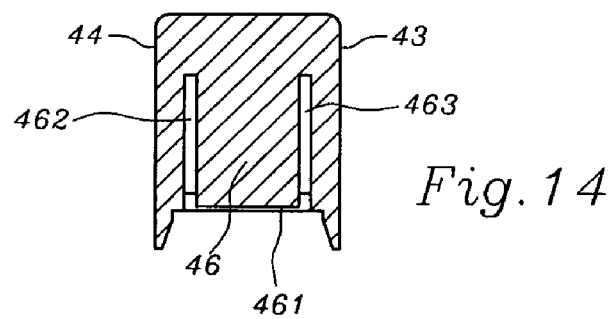
FIG. 14 is the cross-sectional view of the portion taken on line of 14-14 of FIG. 13.
Figure 15:
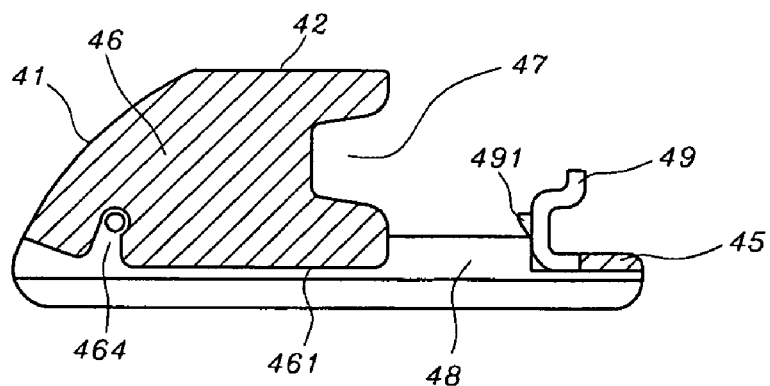
FIG. 15 is the cross-sectional view of the portion taken on line of 15-15 of FIG. 13.
Figure 16:
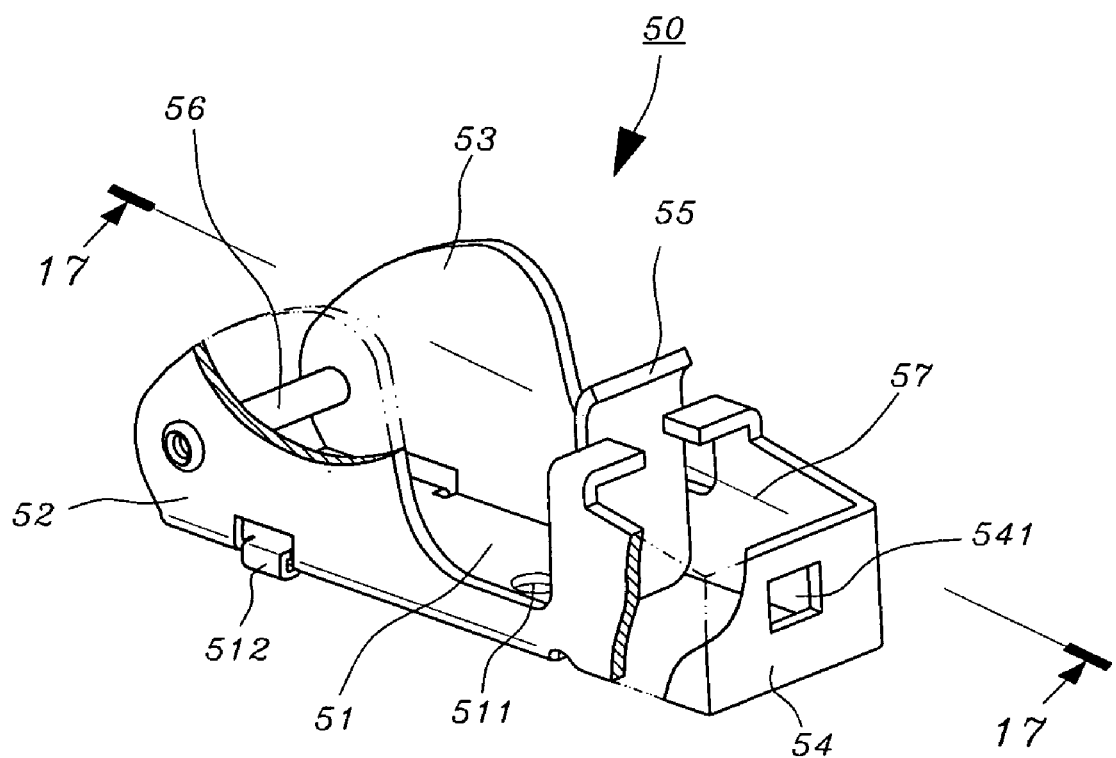
FIG. 16 is the 3-D view of the chassis of the present invention.
Figure 17:
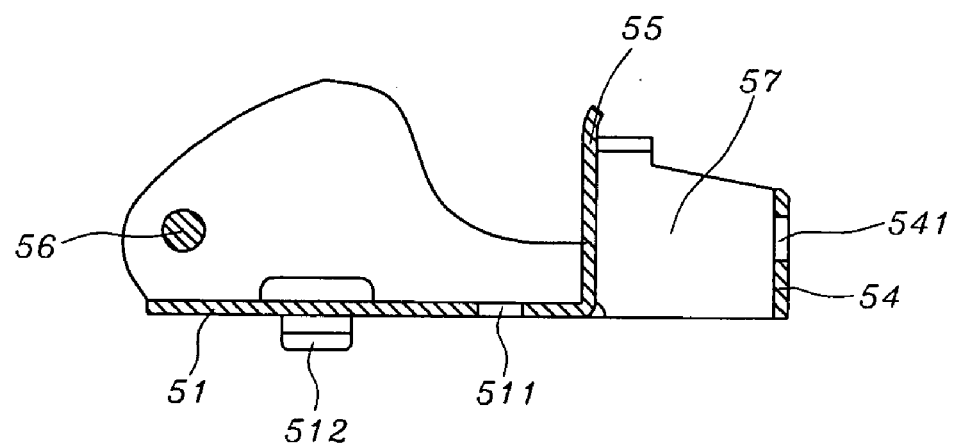
FIG. 17 is the cross-sectional view of the portion taken on line of 17-17 of FIG. 16.

Referring to FIG. 13 through FIG. 17, the present invention, joint assembly of a car windshield wiper arm comprises:

an upper cover body 4O, having a front side 41, a top side 42, a bottom side, a left side 43, a right side 44, a rear end 45, and a solid core 46 between said left side 43 and said right side 44; wherein, a left groove cut 462 is formed upward from said bottom side between said left side 43 and said solid core 46, and a right groove cut 463 is formed upward from said bottom side between said right side 44 and said solid core 46 (as shown in FIG. 14); a round groove cut 464 with V-shaped cross-section is concaved near said front side 41; a trapezohedron receptacle 47 is formed horizontally across a rear of said solid core having a rear facing opening; said left side 43 and right side 44 respectively including a parallel and symmetrical left rib 431 and right rib 441, said left rib 431 and said right rib 441 extending from below said trapezohedron receptacle 47 rearward to said rear end 45 to encompass a hollow socket 48; an elastic upright embed hook 49 is built and centered on a top surface of said rear end 45 in correspondence with said trapezohedron receptacle 47; a horizontal insetting nose 491 is formed in a middle section of said elastic upright embed hook 49 with direction facing towards said hollow socket 48 (as shown in the FIG. 15); and a chassis, having a bottom plate, a left plate 52, a right plate and a rear plate 54; wherein, a fixing hole 511 is perforated at the center of said bottom plate 51; a pair of parallel and symmetrical inset clips 512 are concaved between said fixing hole 511 and a front edge of said bottom plate 51; the wiper elastic strip 5 can be securely infixed with said chassis 50 by means of a rivet through said fixing hole 511 together with said two inset clips 512 so that no displacement or detachment occurs; and, said left plate 52 and right plate 53 are extended upward from respective left and right sides of said bottom plate, the left plate 52 and right plate 53 being parallel and symmetrical; an upright curbing plate 55 is formed by bending the rear end of said bottom plate 51 upwards (as shown in the FIG. 17); a horizontal fixing pivot 56 is bridged between said left plate 52 and said right plate 53 near the front end; an upright hollow plug 57 is encompassed by extending a middle section of said left plate 52 and said right plate 53 backwards to said rear plate 54; an insetting hole 541 is perforated at the center of said rear plate 54 to allow buckle engagement of said insetting nose 491 at said elastic upright embed hook 49 of said upper cover body 40.

Refer to FIG. 18 through FIG. 22, steps of assembling the present invention with the conventional said wiper arm 1, with said trapezohedron shaft 2, are shown. First, align said round groove cut 464 on the said core 46 of said upper cover body 40 with said fixing pivot 56 of said chassis 50 (as shown in the FIG. 18), and apply force to let them engage each other in order to become a pivot (as shown in A view of the FIG. 22); subsequently, align said trapezohedron shaft 2 of said wiper arm 1 with said trapezohedron receptacle 47 of said upper cover body 40 (as shown in the FIG. 19); Finally, apply force downwards until the snap sound of said insetting nose 491 on said elastic upright embed hook 49 of said upper cover body 40 slipping into said insetting hole 541 of said chassis 50 to make sure the finish of rigging join between said wiper arm 1 and said wiper scraping blade 6 (as shown in the FIG. 20); Then, with free rotation function of said trapezohedron shaft 2, said wiper is enabled to sway or tilt on said wiper arm 1 in some limit (as shown in the FIG. 21).

Refer to FIG. 22, the detailed steps of buckling engagement between said upper cover body 40 and said chassis 50 are shown. First, said hollow socket 48 on said upper cover body 40 is inserted by said hollow plug 57 on said chassis 50, and contacted with said insetting nose 491 on said elastic upright embed hook 49 (as shown in B view of the FIG. 22);

Under continuous acting force from said wiper arm 1, said elastic upright embed hook 49 will be deformed eventually, so that said upright curbing plate 55 on said chassis 50 will partially block the opening of said trapezohedron receptacle 47 (as shown in C view of the FIG. 22); Finally, the opening of said trapezohedron receptacle 47 will be completely blocked after said insetting nose 491 on said elastic upright embed hook 49 fully infixes into said insetting hole 541 on said rear plate 54 (as shown in D view of the FIG. 22); Therefore, said trapezohedron shaft 2 is steadfastly confined in said trapezohedron receptacle 47 so that said wiper scraping blade 6 is securely and fixedly jointed with said wiper arm 1.

Figure 23:
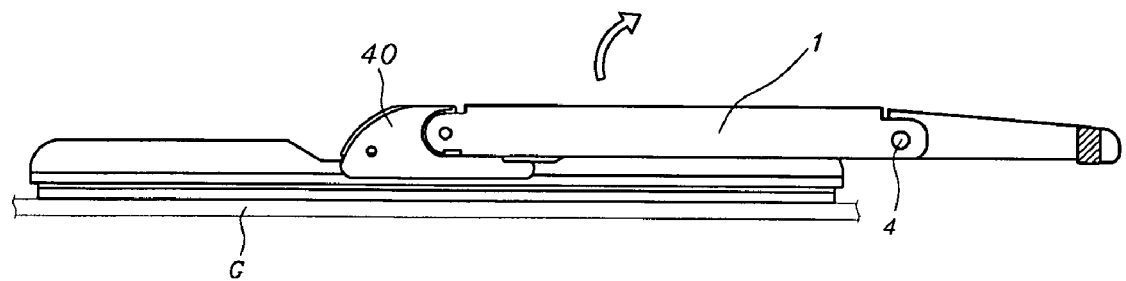
FIG. 23 is the first operation illustrative view of the present invention in combination with the windshield wiper and conventional wiper arm with trapezohedron shaft.
Figure 24:
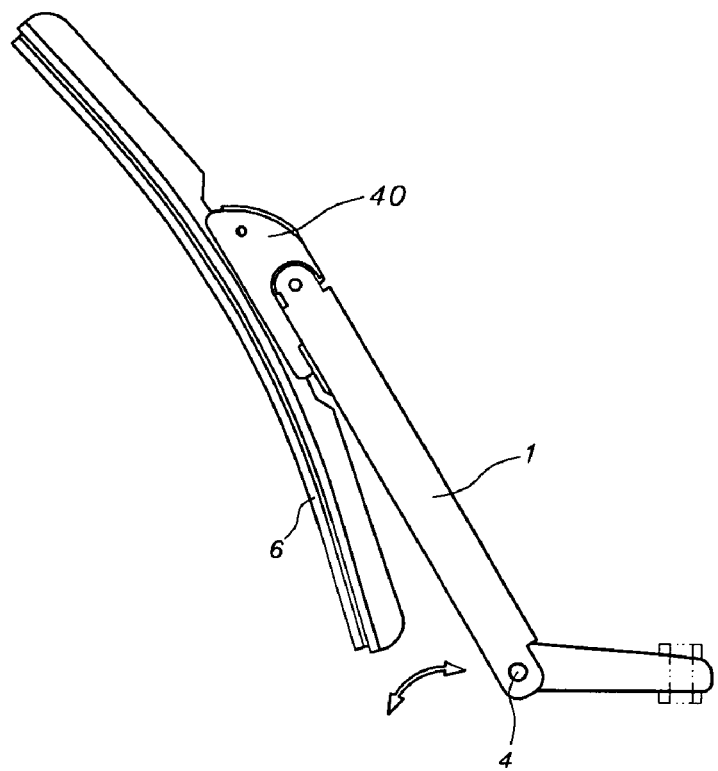
FIG. 24 is the second operation illustrative view of the present invention in combination with the windshield wiper and conventional wiper arm with trapezohedron shaft.
Figure 25:
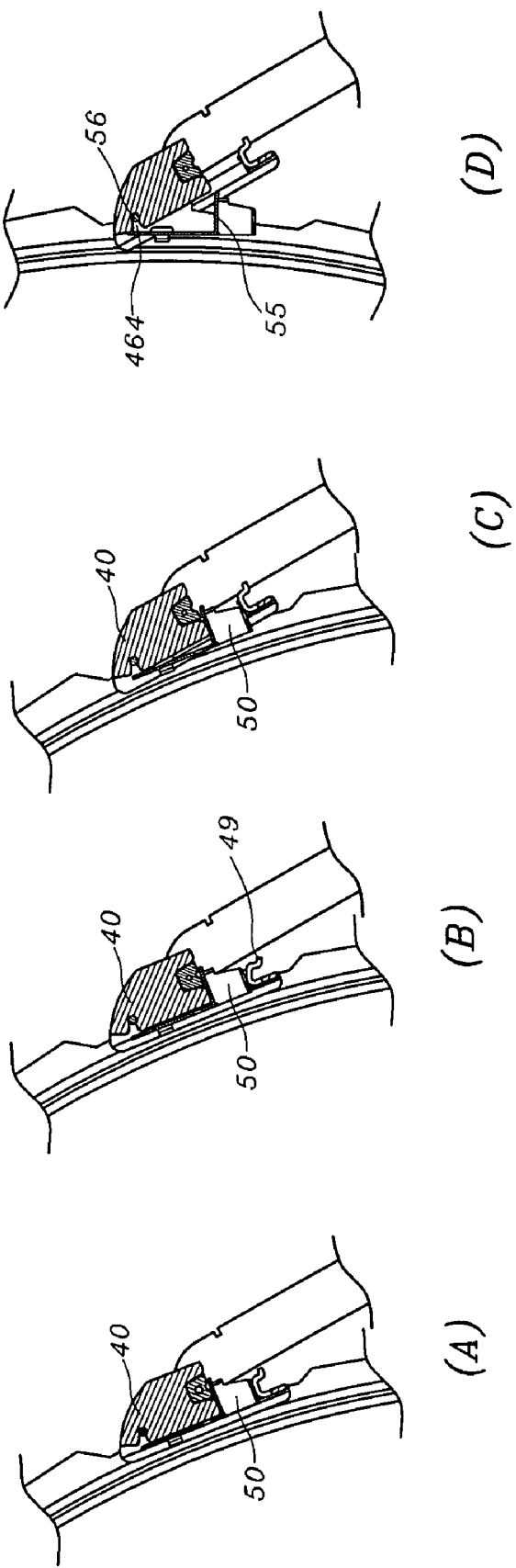
FIG. 25 is the illustrative view of the present invention in dismantling step from the conventional wiper arm with trapezohedron shaft.

Referring to FIG. 23 through FIG. 25, dismantling worn wiper for replacement is shown. First, apply an upwards force on said wiper arm 1, which is tightly stay with the windshield G in horizontal position (as shown in the FIG. 23); With pivot of said elastic foldable articulation 4, said wiper arm 1 is folded in upright position to enable the wiper scraping blade 6 remove away from windshield G (as shown in the FIG. 24); Subsequently, exploiting the original sway space between of said wiper arm 1 and said upper cover body 40, apply a force by finger directly on said elastic upright embed hook 49 to bend it (as shown in B view of the FIG. 25) so that said insetting nose 491 of said elastic upright embed hook 49 detaches off said insetting hole 541, and let said upper cover body 40 start to detach off said chassis 50 (as shown in C view of the FIG. 25); When said hollow socket 48 entirely detach off said hollow plug 57, said upright curbing plate 55 will not block the opening of said trapezohedron receptacle 47 any more; Due to said round groove cut 464 on said upper cover body 40 is still inset said fixing pivot 56 on said chassis 50 (as shown in D view of the FIG. 25), the wiper as being held will not drop downwards to hit and hurt windshield at all; Finally, apply an upwards force on said upper cover body 40 to completely separate off said trapezohedron shaft 2 of said wiper arm 1; furthermore, without any component force, said wiper arm 1 will not unexpectedly re-bounce back to cause any serious loss by hitting and hurting windshield; moreoover, said upper cover body 40 will not inadvertently drop on the ground due to said round groove cut 464 being inset by said fixing pivot 56 on said chassis.

What is claimed is:

1. A joint of a car windshield wiper arm, comprising:

an upper cover body having a front side, a top side, a bottom side, a left side, a right side, a rear end, and a solid core between said left side and said right side; wherein a left groove cut is formed upward from said bottom side between said left side and said solid core, and a right groove cut is formed upward from said bottom side between said right side and said solid core; a round groove cut with V-shaped cross-section is concaved near said front side; a trapezohedron receptacle is formed horizontally across a rear of said solid core having a rear facing opening; said left side and right side respectively including a parallel and symmetrical left rib and right rib, said left rib and said right rib extending from below said trapezohedron receptacle rearward to said rear end to encompass a hollow socket; an elastic upright embed hook is built and centered on a top surface of said rear end in correspondence with said trapezohedron receptacle; a horizontal insetting nose is formed in a middle section of said elastic upright embed hook with direction facing towards said hollow socket; and a chassis having a bottom plate, a left plate, a right plate and a rear plate; wherein, a fixing hole is perforated at the center of said bottom plate; a pair of parallel and symmetrical inset clips are concaved between said fixing hole and a front edge of said bottom plate; said left plate and right plate are extended upward from respective left and right sides of said bottom plate, the left plate and right plate being parallel and symmetrical; an upright curbing plate is formed by bending the rear end of said bottom plate upwards; a horizontal fixing pivot is bridged between said left plate and said right plate near the front end; an upright hollow plug is encompassed by extending a middle section of said left plate and said right plate backwards to said rear plate; an insetting hole is perforated at the center of said rear plate.

* * * * *